US011480153B2

(12) United States Patent
Holliday, III et al.

(10) Patent No.: US 11,480,153 B2
(45) Date of Patent: Oct. 25, 2022

(54) SYSTEM AND METHOD FOR CONTROLLING A WIND TURBINE TO PROTECT THE WIND TURBINE FROM ANOMALOUS OPERATIONS

(71) Applicant: General Electric Company, Schenectady, NY (US)

(72) Inventors: Cornelius Edward Holliday, III, Forest, VA (US); Mathew Doyle Angel, Greenville, SC (US); Robert Gregory Wagoner, Roanoke, VA (US); Nathan Michael Killeen, Simpsonville, SC (US); Edward Wayne Hardwicke, Jr., Greenville, SC (US); Steven Wade Sutherland, Roanoke, VA (US); Govardhan Ganireddy, Salem, VA (US); Fernando Arturo Ramirez Sanchez, Salem, VA (US); Talha Irfanul Haque, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 16/880,394

(22) Filed: May 21, 2020

(65) Prior Publication Data
US 2021/0363968 A1    Nov. 25, 2021

(51) Int. Cl.
*F03D 7/04*    (2006.01)
*F03D 7/02*    (2006.01)

(52) U.S. Cl.
CPC .......... *F03D 7/042* (2013.01); *F03D 7/0244* (2013.01); *F03D 7/0264* (2013.01)

(58) Field of Classification Search
CPC ....... F03D 7/042; F03D 7/0244; F03D 7/0264
See application file for complete search history.

(56) References Cited

U.S. PATENT DOCUMENTS

| 5,907,192 A | 5/1999 | Lyons et al. |
| 6,254,197 B1 | 7/2001 | Lading et al. |
| 7,586,216 B2 * | 9/2009 | Li .............................. H02P 3/22 |
| | | 307/151 |

(Continued)

FOREIGN PATENT DOCUMENTS

| CN | 108626070 A | 10/2018 |
| EP | 1007844 A1 | 6/2000 |

(Continued)

OTHER PUBLICATIONS

European Search Report for EP Application No. 21174765.4, dated Sep. 28, 2021.

*Primary Examiner* — Kenneth Bomberg
*Assistant Examiner* — Ryan C Clark
(74) *Attorney, Agent, or Firm* — Dority & Manning, P.A.

(57) ABSTRACT

A system and method are provided for controlling a wind turbine to protect the wind turbine from anomalous operations. Accordingly, in response to receiving data indicative of an anomalous operational event of the wind turbine, the controller initiates an enhanced braking mode for the wind turbine. The enhanced braking mode is characterized by operating the generator at a torque setpoint that generates maximum available torque for a given set of operating conditions. Additionally, the torque setpoint is in excess of a nominal torque limit for the generator.

18 Claims, 9 Drawing Sheets

(56) References Cited

U.S. PATENT DOCUMENTS

| | | | |
|---|---|---|---|
| 7,948,100 B2 | 5/2011 | Nies et al. | |
| 8,080,891 B2 | 12/2011 | Schramm et al. | |
| 8,664,788 B1* | 3/2014 | Wagoner | H02J 3/381 |
| | | | 290/55 |
| 8,975,768 B2* | 3/2015 | Wagoner | H02P 9/10 |
| | | | 290/55 |
| 10,001,108 B2* | 6/2018 | Oing | F03D 7/0276 |
| 10,063,172 B2* | 8/2018 | Dharmadhikari | H02P 9/08 |
| 10,186,996 B1* | 1/2019 | Holliday | H02P 9/006 |
| 2002/0190695 A1* | 12/2002 | Wall | H02J 1/14 |
| | | | 322/17 |
| 2014/0050579 A1* | 2/2014 | Perley | F03D 7/0248 |
| | | | 416/1 |
| 2015/0008673 A1* | 1/2015 | Damen | F03D 7/0272 |
| | | | 290/44 |
| 2016/0118786 A1* | 4/2016 | Zhu | F03D 7/0284 |
| | | | 290/44 |
| 2017/0114775 A1* | 4/2017 | Agarwal | F03D 7/0272 |
| 2017/0257046 A1* | 9/2017 | Schnetzka | H02P 9/42 |
| 2018/0034264 A1* | 2/2018 | Wagoner | H02P 9/102 |
| 2019/0097551 A1* | 3/2019 | Nagarajan | H02P 6/24 |

FOREIGN PATENT DOCUMENTS

| | | |
|---|---|---|
| EP | 2362527 A1 | 8/2011 |
| GB | 2382734 A | 6/2003 |

* cited by examiner

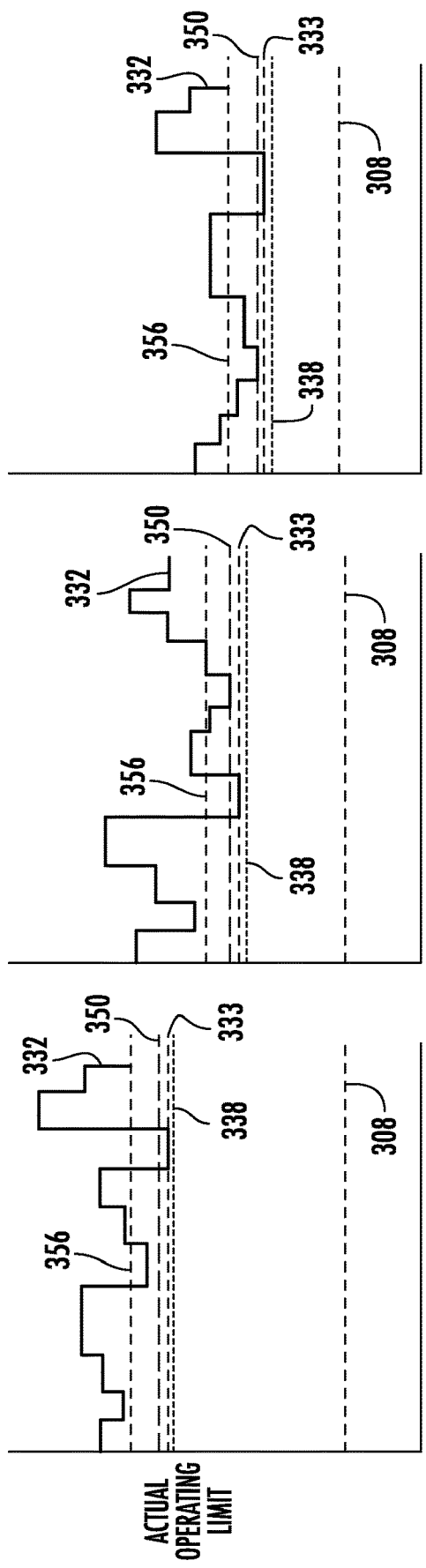

SYSTEM AND METHOD FOR CONTROLLING A WIND TURBINE TO PROTECT THE WIND TURBINE FROM ANOMALOUS OPERATIONS

FIELD

The present disclosure relates in general to wind turbines, and more particularly to systems and methods for controlling wind turbines to protect the wind turbine from anomalous operations.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

In certain instances, the wind turbine may experience an anomalous operational event, such as an overspeed condition, a portion of a rotor blade (or the rotor blade in its entirety) separating from the wind turbine, and/or other significant deviation from the normal operating state of the wind turbine. Such events may cause significant damage to the wind turbine.

The damage resulting from the anomalous operational event may increase with continued operation of the wind turbine. For existing wind turbines, the controller typically decelerates the rotor using components of the wind turbine operating within nominal design limits. The nominal design limits may typically be established at levels which permits the operation of the components of the wind turbine in all conditions without affecting a nominal life expectancy of the components. However, the rate of deceleration achievable while operating under the nominal design limits may be inadequate to prevent or mitigate damage to the wind turbine resulting from the anomalous operational event. Accordingly, it may, in response to an anomalous operational event, be desirable in certain instances to decelerate the rotor in an expedited manner not achievable under the nominal design limits.

Thus, the art is continuously seeking new and improved systems and methods that address the aforementioned issues. As such, the present disclosure is directed to systems and methods for controlling a wind turbine to protect the wind turbine from anomalous operations.

BRIEF DESCRIPTION

Aspects and advantages of the invention will be set forth in part in the following description, or may be obvious from the description, or may be learned through practice of the invention.

In one aspect, the present disclosure is directed to a method for protecting a wind turbine from anomalous operations. The method may include receiving, with a controller of the wind turbine, data indicative of an anomalous operational event of the wind turbine. In response to receiving the data indicative of the anomalous operational event of the wind turbine, the method may include initiating, with the controller, an enhance braking mode for the wind turbine. The enhanced braking mode may be characterized by operating the generator at a torque setpoint that generates a maximum available torque for a given set of operating conditions and which is in excess of a nominal torque limit for the generator. Additionally, the method may include operating, with the controller, the wind turbine in the enhanced braking mode.

In an embodiment, the enhanced braking mode may include a first enhanced braking mode. The method may further include determining, with a converter controller of the wind turbine, an actual operating parameter for each of a plurality of electrical system components. The method may also include determining, with the converter controller, an actual operating limit for each of the electrical system components based on the determined actual operating parameters. The actual operating limit may indicate an operating parameter value below which the electrical system components retain a nominal life expectancy. Operating the electrical system components below the actual operating limit may preclude the tripping of the electrical system components. Additionally, the method may include determining, with the converter controller, an enhanced torque limit for the generator relative to the actual operating limit for each of the electrical system components and at least one mechanical limit of a drivetrain of the wind turbine. Further, the method may include establishing, with the converter controller, the torque setpoint relative to the enhanced torque limit.

In an additional embodiment, the actual operating parameter may include voltage, current, and/or temperature levels of the electrical system components and/or a rotational speed of the generator.

In a further embodiment, the actual operating limit for each of the electrical system components may be a value corresponding to a bridge switching device temperature, a coolant temperature, a modeled converter component temperature, and/or a generator temperature. The method may also include detecting, with the converter controller, an approach of an actual operating parameter to a corresponding actual operating limit. Additionally, the method may include reducing, with the converter controller, the torque setpoint so as to prevent damaging or tripping the electrical system component during the application of the maximum available torque in the first enhanced braking mode.

In an embodiment, the method may also include increasing, with the converter controller, the actual operating limit for the electrical system component so as to increase a duration of the maximum available torque in the first enhanced braking mode. Increasing the actual operating limit may reduce a life expectancy of the electrical system component relative to a nominal life expectancy of the electrical system component.

In an additional embodiment, the enhanced braking mode may include a second enhanced braking mode and the anomalous operational event may be indicative of a failure of a blade or a tower of the wind turbine. The method may include overriding, with a converter controller of the wind turbine, a plurality of nominal operating thresholds corresponding to a plurality of electrical system components.

Overriding the plurality of nominal operating thresholds may increase a maximal value of the torque of the generator developed by the electrical system relative to a nominal torque limit. Additionally, the method may include permitting an increased wear rate relative to a nominal wear rate of the electrical system component(s) in favor of generating the maximal generator torque.

In a further embodiment, overriding the plurality of nominal operating thresholds may include raising a thermal protection limit, an overvoltage limit, an undervoltage limit, and/or a current limit of the electrical system.

In an embodiment, permitting the increased wear rate of at least one of the plurality of electrical system components may include permitting consumption of a remaining useful life of the electrical system component so as to generate the maximal available torque for a maximal duration in the enhanced braking mode.

In an additional embodiment, the wind turbine may also include a slip coupling operably coupling the generator to a gearbox of the wind turbine. The method may also include monitoring, with the converter controller, a torque level of the slip coupling. Additionally, the method may include reducing, with the converter controller, the torque of the generator when the torque level of the slip coupling approaches a release threshold of the slip coupling.

In a further embodiment, the anomalous operation of the wind turbine may include an overspeed event a pitch system failure, a blade departure, or combinations thereof or any other anomalous operation.

In another aspect, the present disclosure is directed to a system for controlling a wind turbine. The system may include a sensor system including at least one sensor operably coupled to a component of the wind turbine to detect an anomalous operational event of the wind turbine. The system may also include a controller communicatively coupled to the sensor system. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 9A-9C illustrate graphical representations of embodiments of operating limits and torque limits of the electrical system of the wind turbine according to the present disclosure.

Figure 1:
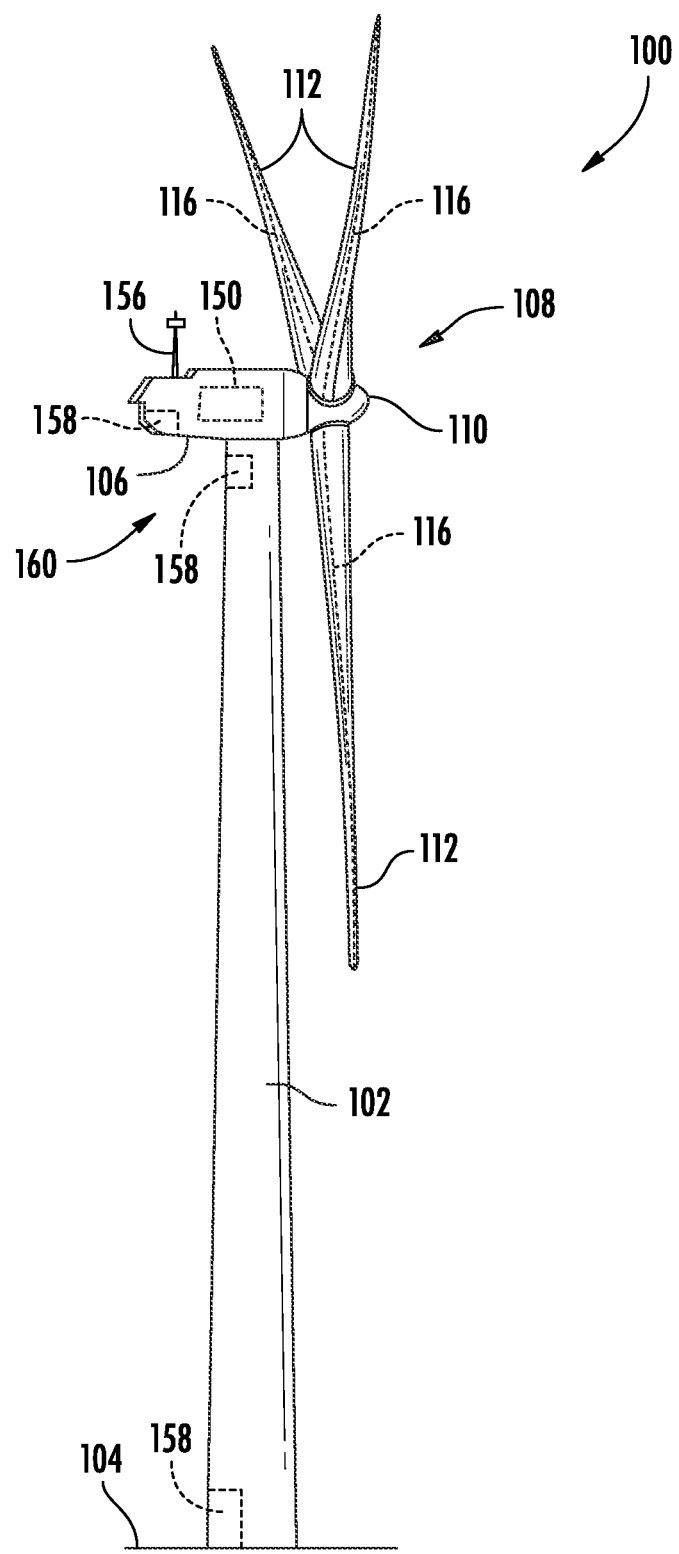
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine to protect the wind turbine from anomalous operations. In particular, the present disclosure includes systems and methods which facilitate operating the generator at generator setpoints that enable the generation of a maximum available torque for a given set of operating conditions. The setpoints may be in excess of a nominal torque limit for the generator.

In accordance with the present disclosure, the systems and methods may include a first enhanced braking mode which may be employed when the anomalous operational event is not indicative of a failure of the rotor and/or the tower of the wind turbine. As the nominal torque limits are typically set to ensure the safe operation of the wind turbine in essentially all operating conditions, the nominal torque limits may be fairly conservative. This conservativeness may be reflected in the nominal operating limits for the various components of the electrical system. As a result, under the actual conditions affecting the wind turbine at the moment of the anomalous operational event, components of the electrical system may, in fact, be operated safely at levels above the corresponding nominal operating limits. By determining the actual operating limits for the various components based on the actual operating conditions, the controller may determine an enhanced torque limit for the generator which exceeds the nominal torque limit. This, in turn, may facilitate the development and application of the maximum available torque to decelerate the rotor of the wind turbine. In other words, the first braking mode may leverage the difference between nominal design limits and the actual operating limits of the various components to generate the maximum torque which may be generated under the given conditions.

In connection with the first enhanced braking mode, the system and methods may also include a second enhanced braking mode. The second enhanced braking mode may be employed when the anomalous operational event is indicative of a failure of the rotor and/or the tower of the wind turbine. Under the second enhanced braking mode, the controller may override the nominal operating thresholds of various electrical system components in favor of increasing a maximal amount of torque with the generator. Accordingly, overriding the nominal operating thresholds may result in an increased wear rate for the components relative to a nominal wear rate. In other words, under the second enhanced braking mode, the consequences to the wind turbine of continuing to operate under the anomalous operational event may justify accepting damage to various components of the electrical system in favor of decelerating the rotor as quickly as possible. For example, in operating the component(s) above the nominal operational limit, excessive loading or damage of the component(s) may be permitted in favor generating a force to slow the rotor. For example, the generator of the turbine may be operated at a generator setpoint which permits the generator to develop a generator torque exceeding a nominal generator torque limit. It should be appreciated that generating torque in excess of the torque limit may, for example, result in an operating temperature increase for various components of the electrical system that may degrade the components of the electrical system.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
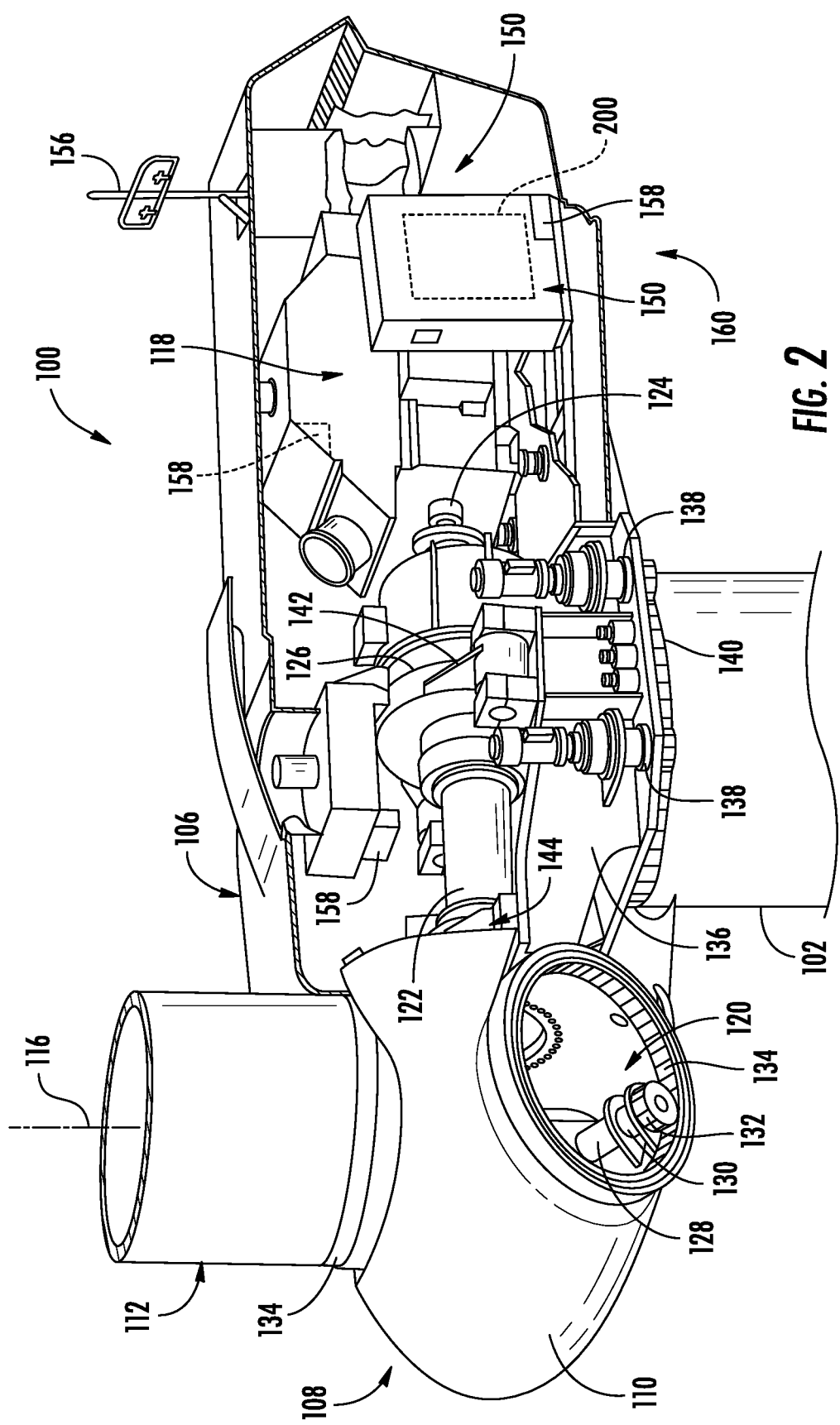
FIG. 2 illustrates a perspective, internal view of one embodiment of a nacelle of the wind turbine according to the present disclosure.
Figure 3:
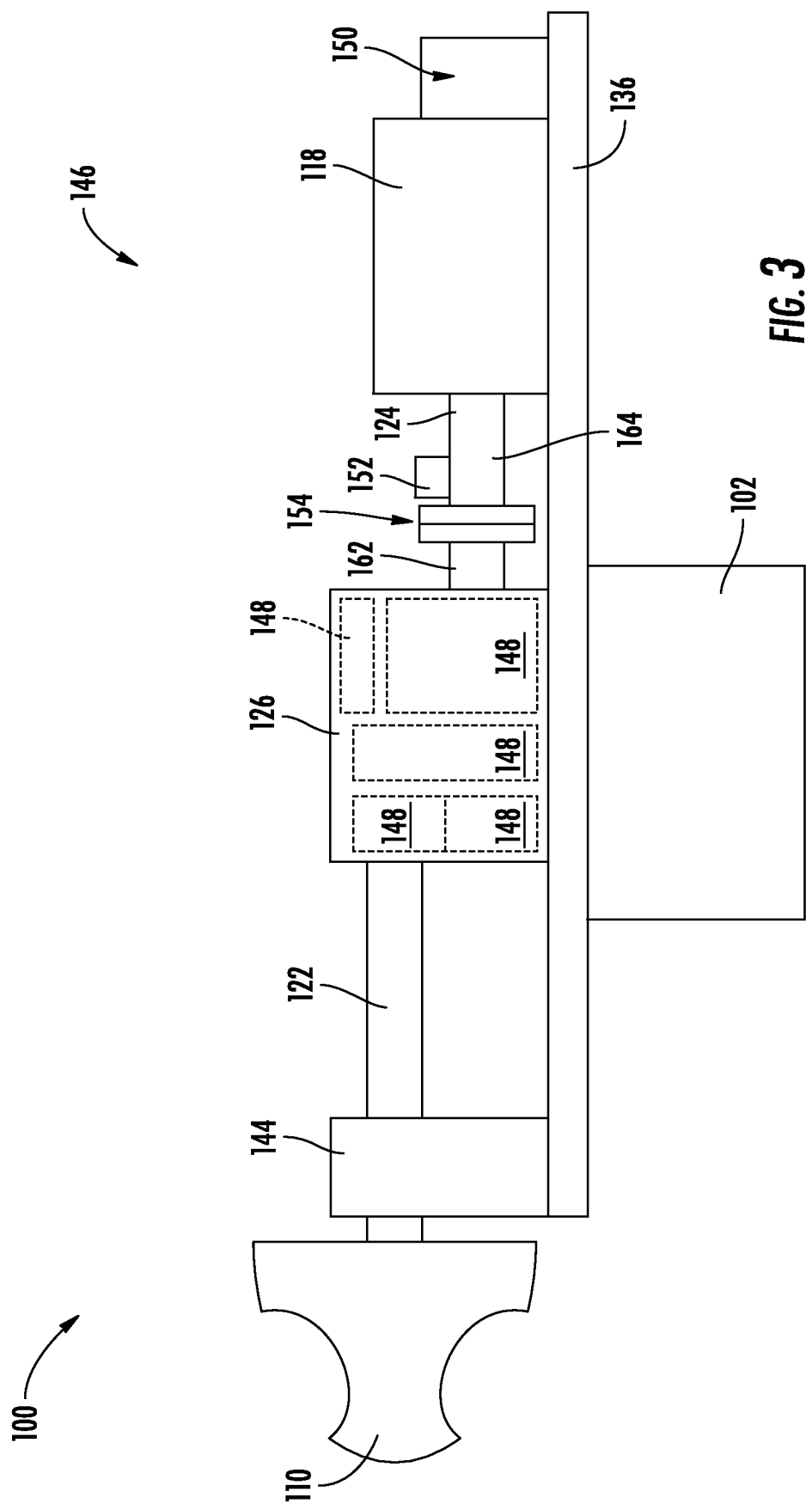
FIG. 3 illustrates a schematic diagram of one embodiment of a drivetrain of the wind turbine according to the present disclosure.
Figure 4:
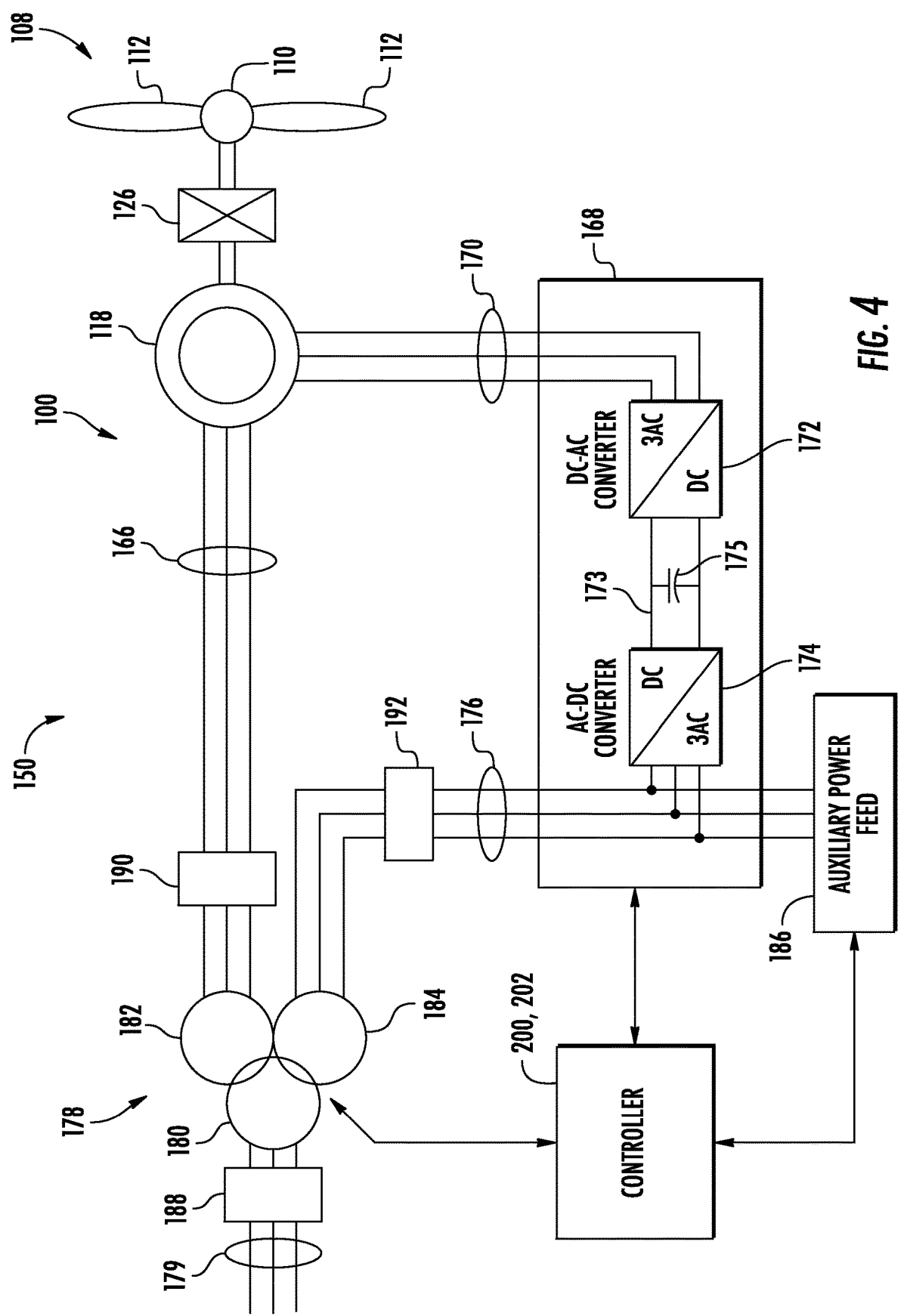
FIG. 4 illustrates a schematic diagram of one embodiment of an electrical system for use with the wind turbine according to the present disclosure.
Figure 5:
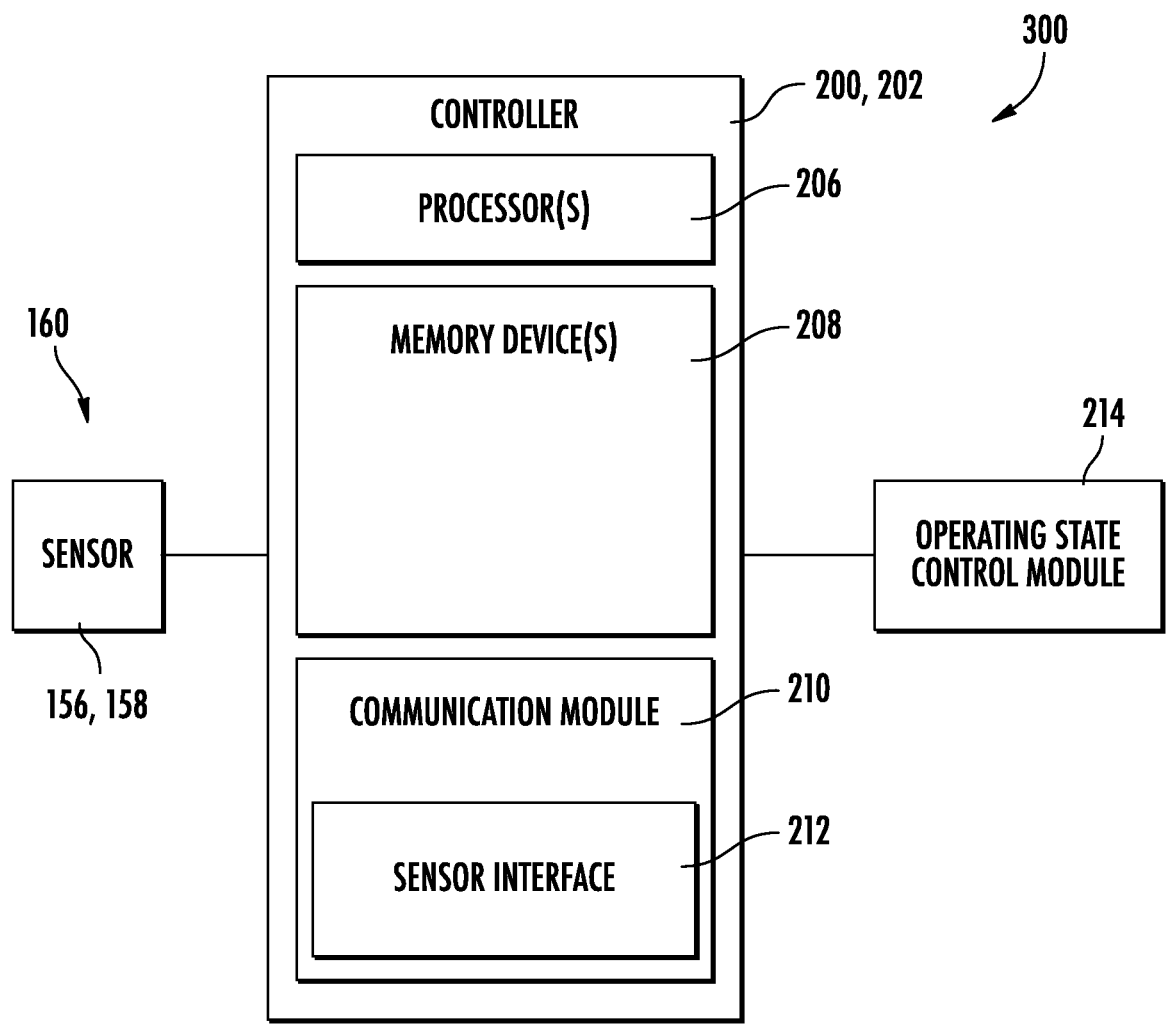
FIG. 5 illustrates a schematic diagram of one embodiment of a controller for use with the wind turbine according to the present disclosure.

Referring now to FIGS. 2-4, a simplified, internal view of one embodiment of the nacelle 106, a schematic diagram of one embodiment of a drivetrain 146, and an exemplary electrical system 150 of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

In an embodiment, the wind turbine 100 may include a brake 152 positioned so as to resist a rotation of the rotor 108. In at least one embodiment, the brake 152 may be oriented to engage the high-speed shaft 124. The brake 152 may be configured to further slow an already slowing rotor 108 and/or temporarily hold the rotor 108 stationary.

In an additional embodiment, the brake 152 may be employed in conjunction with, or as an adjunct to, other means of slowing the rotor 108. For example, in an embodiment, the rotor 108 may be slowed via a torque generated by the generator 118. As the generator 118 may generate a torque counter to the rotation of the rotor 108, the high-speed shaft 124 may be equipped with a slip coupling 154. The slip coupling 154 may prevent damage to a component of the drivetrain 146 due to overloading of the drivetrain 146. As such, the slip coupling 154 may have a release threshold above which the slip coupling 154 may permit first and second portions 162, 164 of the high-speed shaft 124 to have a different rotational velocities. It should be appreciated that, if the torsional moment at the slip coupling 154 exceeds the release threshold, the generator 118 may be communicatively decoupled from the rotor 108. In such an event, the torque developed by the generator 118 may be unavailable to slow the rotor 108.

Each rotor blade 112 may also include a pitch control mechanism 120 configured to rotate the rotor blade 112 about its pitch axis 116. Each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Still referring to FIG. 2, in an embodiment, the wind turbine 100 may include an environmental sensor 156 configured for gathering data indicative of one or more environmental conditions. The environmental sensor 156 may be operably coupled to the controller 200. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine 100.

In addition, the wind turbine 100 may include a sensor system 160 having a plurality of operational sensors 158. The sensor system 160 may be configured to detect a performance of the wind turbine 100 in response to the environmental condition. For example, the operational sensor(s) 158 may be a rotational speed sensor operably coupled to the controller 200. The operational sensor(s) 158 may be directed at the rotor shaft 122 of the wind turbine 100 and/or the generator 118. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer.

In an embodiment, the sensor system 160 may be configured to monitor operating parameters of the electrical system 150. For example, the sensor system 160 may monitor the voltage, current, and/or temperature levels of the various components of the electrical system 150. Accordingly, the operational sensor(s) 158 may, in an embodiment, be an ammeter, a voltmeter, an ohmmeter, a thermometer and/or any other suitable sensor for monitoring the operating parameters of the electrical system 150.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Referring particularly to FIG. 4, in an embodiment, the electrical system 150 may include various components for converting the kinetic energy of the rotor 108 into an electrical output in an acceptable form to a connected power grid. For example, in an embodiment, the generator 118 may be a doubly-fed induction generator (DFIG). The generator 118 may be coupled to a stator bus 166 and a power converter 168 via a rotor bus 170. In such a configuration, the stator bus 166 may provide an output multiphase power (e.g. 3-phase power) from a stator of the generator 118, and the rotor bus 170 may provide an output multiphase power (e.g. 3-face power) of the rotor of the generator 118. Additionally, the generator 118 may be coupled via the rotor bus 170 to a rotor side converter 172. The rotor side converter 172 may be coupled to a line side converter 174 which, in turn, may be coupled to a line side bus 176.

In an embodiment, the rotor side converter 172 and the line side converter 174 may be configured for normal operating mode in a three-phase, pulse width modulation (PWM) arrangement using insulated gate bipolar transistors (IGBTs) as switching devices. Other suitable switching devices may be used, such as insulated gate commuted thyristors, MOSFETs, bipolar transistors, silicone controlled rectifier's, and/or other suitable switching devices. The rotor side converter 172 and the line side converter 174 may be coupled via a DC link 173 across which may be a DC link capacitor 175.

In an embodiment, the power converter 168 may be coupled to the controller 200 configured as a converter controller 202 control the operation of the power converter 168. For example, the converter controller 202 may send control commands to the rotor side converter 172 and the line side converter 174 to control the modulation of switching elements used in the power converter 168 to establish a desired generator torque setpoint and/or power output.

As further depicted in FIG. 4, the electrical system 150 may, in an embodiment, include a transformer 178 coupling the wind turbine 100 to an electrical grid 179. The transformer 178 may, in an embodiment, be a three-winding transformer which includes a high voltage (e.g. greater than 12 KVAC) primary winding 180. The high voltage primary winding 180 may be coupled to the electrical grid 179. The transformer 178 may also include a medium voltage (e.g. 6 KVAC) secondary winding 182 coupled to the stator bus 166 and a low voltage (e.g. 575 VAC, 690 VAC, etc.) auxiliary winding 184 coupled to the line bus 176. It should be appreciated that the transformer 178 can be a 3-winding transformer as depicted, or alternatively, may be a 2-winding transformer having only a primary winding 180 and a secondary winding 182; may be a 4-winding transformer having a primary winding 180, a secondary winding 182, and auxiliary winding 184, and an additional auxiliary winding; or may have any other suitable number of windings.

In an additional embodiment, the electrical system 150 may include an auxiliary power feed 186 coupled to the output of the power converter 168. The auxiliary power feed 186 may act as a power source for various components of the wind turbine system 100. For example, the auxiliary power feed 186 may power fans, pumps, motors, and other suitable components of the wind turbine system 100.

In an embodiment, the electrical system 150 may also include various circuit breakers, fuses, contactors, and other devices to control and/or protect the various components of the electrical system 150. For example, the electrical system 150 may, in an embodiment, include a grid circuit breaker 188, a stator bus circuit breaker 190, and/or a line bus circuit breaker 192. The circuit breaker(s) 188, 190, 192 of the electrical system 150 may connect or disconnect corresponding components of the electrical system 150 when a condition of the electrical system 150 approaches an operational threshold of the electrical system 150.

Referring now to FIGS. 5-8, schematic diagrams of multiple embodiments of a system 300 for controlling the wind turbine 100 according to the present disclosure are presented. As shown particularly in FIG. 5, a schematic diagram of one embodiment of suitable components that may be included within the system 300 is illustrated. For example, as shown, the system 300 may include the controller 200 communicatively coupled to the environmental sensor(s) 156 and the operational sensors 158 of the sensor system 160. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158, 160 may be communicatively coupled to the communications module 210 using any suitable means. For example, as shown in FIG. 4, the sensor(s) 156, 158: 60 is coupled to the sensor interface 212 via a wired connection. However, in other embodiments, the sensor(s) 156, 158 through may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting an anonymous operational event and initiating an enhanced braking mode for the wind turbine 100 as described herein, as well as various other suitable computer-implemented functions.

Figure 6:
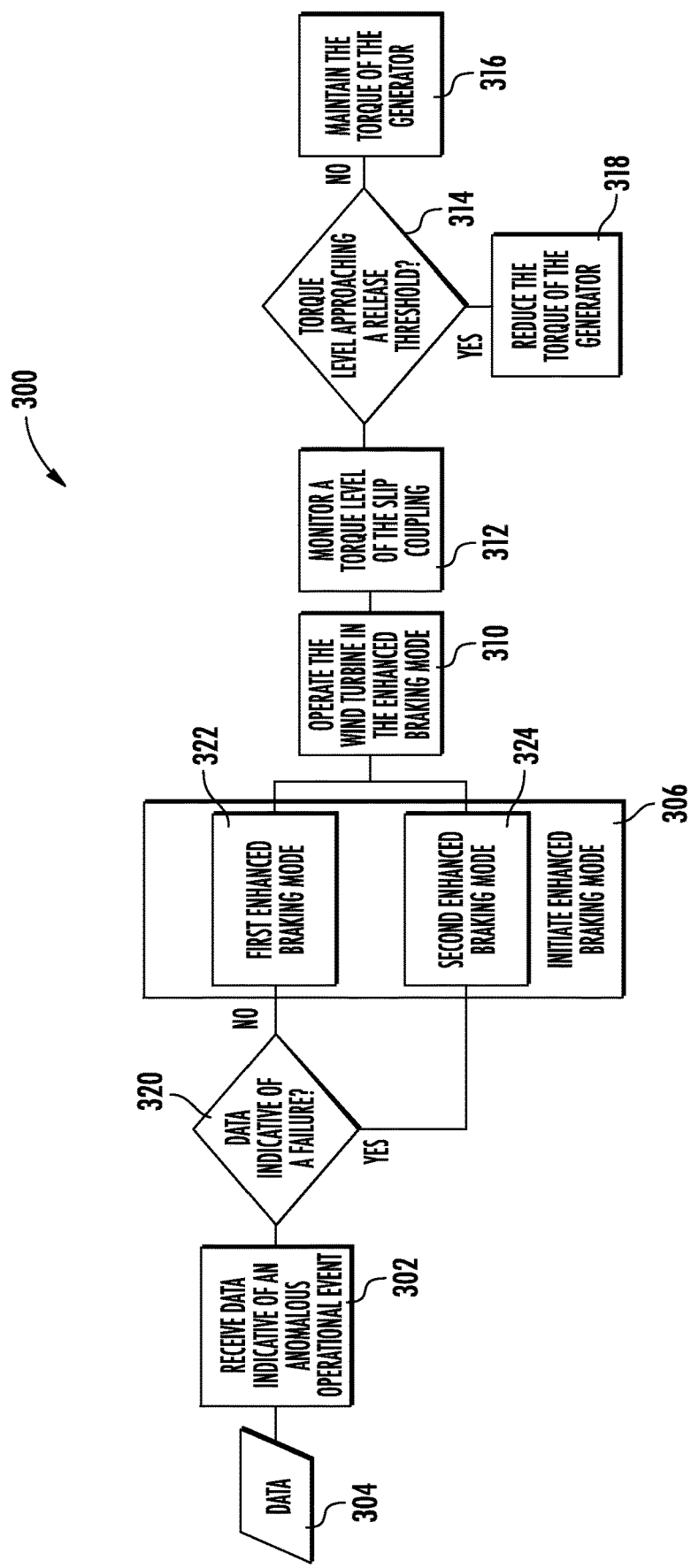
FIG. 6 illustrates a schematic diagram of one embodiment of a control logic of a system for controlling a wind turbine according to the present disclosure.

Referring particularly to FIG. 6 as shown at 302, the system 300 may be configured to receive data 304 indicative of an anomalous operational event of the wind turbine 100. For example, in an embodiment, the controller 200 may receive data 304 from the sensor system 160 indicative of an overspeed event, a pitch system failure, an erroneous pitch command, power/battery backup failure, and/or a blade departure event which may indicate a potential for an increase in a damage level of the wind turbine 100 should the wind turbine 100 continue operating.

For example, in an embodiment, the data 304 may reflect the response of a wind turbine 100 component to an imbalanced load resulting from the loss of a portion of a rotor blade 112. In an embodiment, the data 304 may reflect the components' response to the rotor load in the form of a load magnitude and/or load direction. For example, in an embodiment, the load direction may be along, or reciprocal to, a pitch axis 116. In such an embodiment, a load which is reciprocal to a pitch axis 116 may be indicative of a loss of some or all of a rotor blade 112. In an additional embodiment, the data 304 may indicate an acceleration vector of the component, such as the nacelle 106, the tower 102, or the rotor 108. The data 304 may also include a vibration signature corresponding to a blade liberation event. The vibration signature may, in various embodiments, be indicative of a vibration level/signature in the rotor blade 112, the hub 110, the nacelle 106, a base and/or top of the tower 102, and/or any other component of the wind turbine 100.

In an additional embodiment, the data 304 may indicate a communication loss with at least one of the sensors of the operational sensor(s) 158. For example, the liberation event may also sever a communication coupling of one element of the sensor system 160 coupled to the rotor blade 112. In a further embodiment, the data 304 may include an acoustic signature of the wind turbine. In such an embodiment, a change in the acoustic signature of the wind turbine 100 may be indicative of the liberation event. In yet a further embodiment, the data 304 may indicate a bending moment affecting the rotor shaft 122 and/or the tower 102. It should be appreciated that an increase in the bending moment may be indicative of an imbalanced load generated by the rotor 108 in response to a blade liberation event. It should further be appreciated that the data 304 may include additional signatures and/or combinations of signatures indicative of an anomalous operation of the wind turbine 100.

In an embodiment, as shown at 306, the controller 200 of the system 300 may be configured to initiate an enhanced braking mode for the wind turbine 100 in response to receiving the data 304 indicative of the anomalous operational event. The enhanced braking mode may be characterized by operating the generator 118 at a torque setpoint that generates a maximum available torque for a given set of operating conditions. The torque setpoint may be in excess of a nominal torque limit 308 (FIG. 9) for the generator 118. It should be appreciated that the nominal torque limit 308 may indicate a torque level which may be developed by the generator 118 in all operating conditions of the wind turbine 100 without damaging and/or tripping a component of the electrical system 150. Therefore, establishing the torque setpoint above the nominal torque limit may, in an embodiment, permit excessive loading or damage to a component of the electrical system 150. It should be further appreciated that accepting the excessive loading or damage of the component(s) of the electrical system 150 may be done in favor of rapidly slowing the rotor 108 following an anomalous operational event.

As shown at 310, the converter controller 202 of the system 300 may operate the wind turbine 100 in the enhanced braking mode. By operating the wind turbine 100 in the enhanced braking mode, the converter controller 202 may facilitate the development of a generator torque having a greater magnitude than would otherwise be developed under the nominal torque limit 308. This, in turn, may serve to decelerate the rotor 108 at a rate which is greater than would be achievable when adhering to the nominal torque limit 308. It should be appreciated that utilizing the electrical system 150 to generate an increased rate of deceleration, may serve to prevent/mitigate damage to the wind turbine 100 in response to an anomalous operational event.

As depicted at 312, in an embodiment, the converter controller 202 of the system 300 may be configured to monitor a torque level of the slip coupling 154. It should be appreciated that in an embodiment wherein the torque level of the slip coupling 154 exceeds the nominal release threshold of the slip coupling 154, the slip coupling 154 may operably decouple the generator 118 from the rotor shaft 122. In such an embodiment, the torque developed by the generator 118 may then be unavailable to assist with the slowing of the rotor 108. Accordingly, the system 300 may, at 314 detect the approach of the torque level to a release threshold. In the event the torque level does not approach the release threshold, the converter controller 202 may, at 316, maintain the torque setpoint so as to continue decelerating the rotor in a shortened time interval. However, in an embodiment wherein the torque level of the slip coupling 154 approaches the release threshold, the converter controller 202 may, at 318, reduce the torque setpoint so as to maintain the operable coupling between the generator 118 and the rotor 108.

Referring still particularly to FIG. 6, in an embodiment, the system 300 may, at 320, determine whether the anomalous operational event indicated by the data 304 is indicative of a failure of a blade 112 or the tower 102 of the wind turbine 100. In an embodiment wherein the failure of a blade 112 or the tower 102 is not indicated, the system 300 may initiate a first enhanced braking mode 322. In contrast, in an embodiment wherein the failure of a blade 112 or the tower 102 is indicated, the system 300 may initiate a second enhanced braking mode 324.

Figure 7:
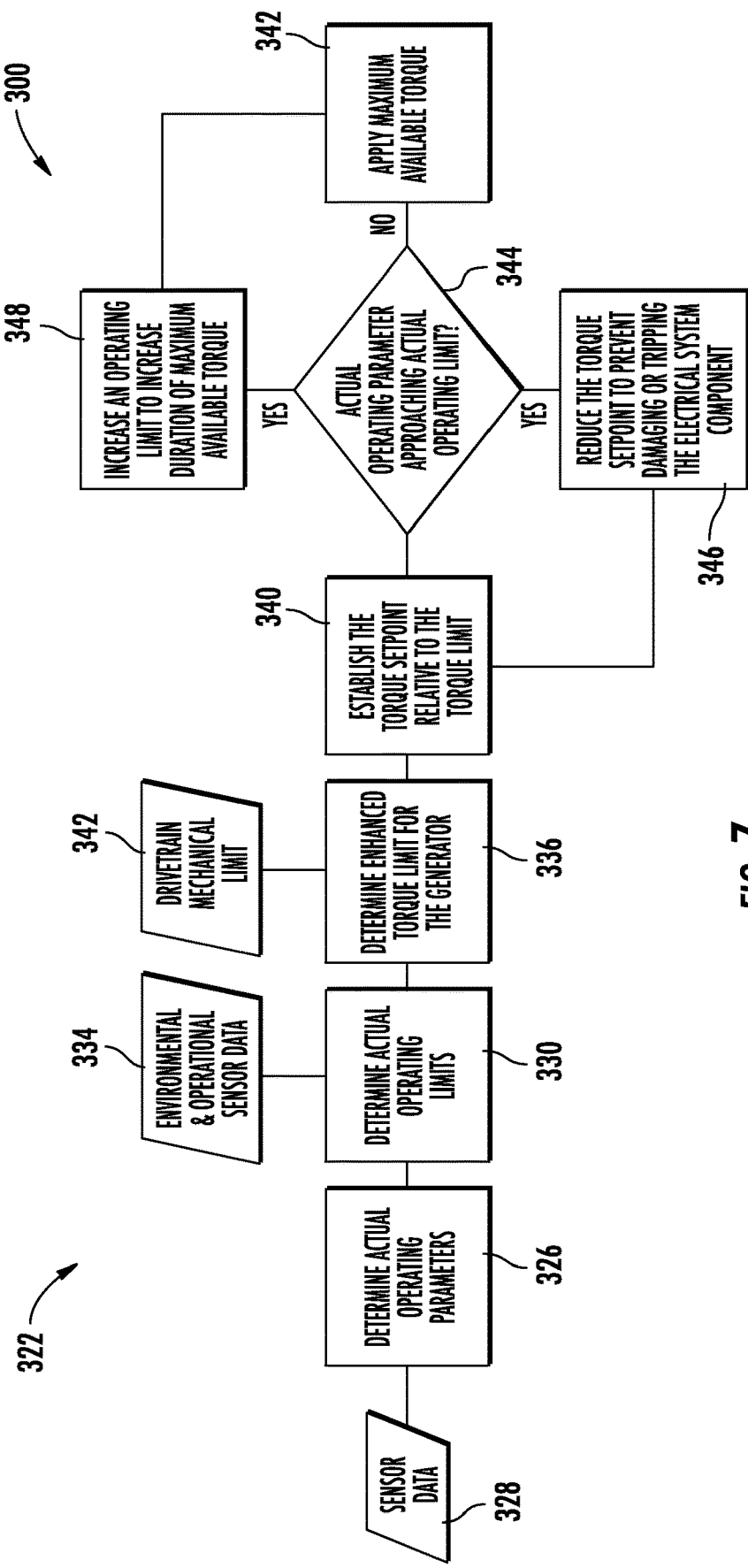
FIG. 7 illustrates a schematic diagram of one embodiment of a portion of the control logic of FIG. 6 corresponding to a first braking mode according to the present disclosure.

Referring now to FIG. 7, a schematic diagram of one embodiment of a portion of the control logic of the system 300 corresponding to the first braking mode 322 is depicted. In an embodiment, wherein the first braking mode 322 is initiated, the converter controller 202 may, at 326, utilize sensor data 328 from the sensor system 160 to determine an actual operating parameter for each of the plurality of component of the electrical system 150. The actual operating parameters may include the voltage, current, and/or temperature levels of the various components of the electrical system 150 as well as the rotational speed of the generator 118 for the given operating conditions of the wind turbine 100. It should be appreciated that the actual operating parameters may vary during the operation of the wind turbine 100.

Referring to FIG. 7 and also to FIG. 9, as shown at 330, the converter controller 202 may determine an actual operating limit 332 for each of the electrical system components based on the determined actual operating parameters. The operating limits 332 for multiple components of the electrical system 150 are graphically combined in FIGS. 9A-9C so as to present a continuous plot line in each. Additionally, each of FIGS. 9A-9C represent the operating limits 332 of the same components at differing operating conditions of the wind turbine 100.

In an embodiment, the actual operating limit 332 may indicate an operating parameter value below which the various components of the electrical system 150 retain a nominal life expectancy. In other words, in an embodiment wherein the component(s) is operated below the actual operating limit 332, the wear rate of the component may not be affected, but when operated above the actual operating limit 332 the wear rate may be accelerated. As such, operating the components of the electrical system 150 below the actual operating limit 332 may preclude the tripping of the electrical system components.

In an embodiment, the component of the electrical system 150 having the lowest actual operating limit 332 may establish a trip threshold 333 for the electrical system 150. Accordingly, operating the electrical system 150 below the trip threshold 333 may preclude the tripping of the electrical system 150. It should be appreciated that tripping the electrical system 150 may hinder the ability of the system 300 to decelerate the rotor 108 in response to an anomalous operational event of the wind turbine 100.

In an embodiment, determining the actual operating limit 332 may include receiving environmental and operational sensor data 334 from the corresponding environmental sensor(s) 156 and the sensor system 160. The converter controller 202 may utilize the environmental and operational sensor data 334 to determine, based on nominal design data for each of the components, the individualized actual operating limit 332 for each of the components of the electrical system 150 based on the detected environmental and operational conditions. For example, in an embodiment, the actual operating limit 332 may be a measured value, or value modeled on the measured values, corresponding to a bridge switching device temperature, a coolant temperature, a converter component temperature, and/or a generator temperature. In such an embodiment, actual operating limit 332 may represent a temperature threshold (a nominal operating threshold) for the component(s) based on the nominal design of the component, and environmental temperature, and/or the operating condition of the wind turbine 100. It should be appreciated, that in an embodiment wherein the component(s) may be operated in a high temperature environment, the maximum acceptable temperature of the component may be lower than for an embodiment wherein the environmental temperature is relatively low. It should further be appreciated that the correlation of the actual operating limit 332 to the environmental and operational sensor data 334 may result in a floating limit which varies in response to changes in the environment and/or operational state of the wind turbine 100.

As depicted at 336, the converter controller 202 may be configured to determine an enhanced torque limit 338 which may be supported by the electrical system 150 without tripping or reducing the nominal life expectancy of the various components of the electrical system 150. The enhanced torque limit 338 may be established based on the actual operating limit 332 for each component of the electrical system 150 and on the various mechanical limits 340 of the drivetrain 146. For example, the enhanced torque limit 338 may be established at a value which is at least 95% of the lowest actual operating limit 332 of the components of the electrical system 150 so long as the value of the enhanced torque limit 338 does not exceed a mechanical limit 340 of the drivetrain 146, such as the release threshold of the slip coupling 154. It should be appreciated that the enhanced torque limit 338 may permit the converter controller 202 to apply the maximum torque available given the ambient temperature, cable temperatures, component temperatures, and/or generator capability.

It should be appreciated that establishing the enhanced torque limit 338 based on the actual operating limits 332 of the electrical system 150 for the given environmental and operational conditions may facilitate the utilization of a torque production capability of the generator 118 which may not have been available when adhering to the nominal torque limit 308. Accordingly, establishing the torque setpoint for the generator 118 relative to the enhanced torque limit 338, at 340, may facilitate the application of the maximum available torque, at 342, to slow the rotor 108.

In an embodiment, the converter controller 202 may, at 344, detect an approach of an actual operating parameter to a corresponding actual operating limit 332. For example, the converter controller 202 may, in an embodiment, receive sensor data 328 from the sensor system 160 indicating that the coolant temperature of a component of the electrical system 150 has increased and is approaching the actual operating limit 332 for the component. In response to detecting the approach of the actual operating parameter to a corresponding actual operating limit 332, the converter controller 202 may, at 346, reduce the torque setpoint of the generator 118 prevent damaging or tripping the electrical system component during the application of the maximum available torque in the first enhanced braking mode 322.

In response to detecting the approach of the actual operating parameter to a corresponding actual operating limit 332, in a further embodiment, the converter controller 202 may, at 348, increase at least one of the actual operating limits 332, as is represented by line 350. Increasing the actual operating limit(s) 332 to line 350, may permit an increase in the duration of the application of the maximum available torque in the first enhanced braking mode 322. However, increasing the actual operating limit(s) 332 may reduce a life expectancy of the corresponding electrical system component(s) relative to the nominal life expectancy of the component(s). For example, increasing the actual operating limit(s) 332 for the component(s) may result in a consumption of a fatigue margin of the component(s).

Figure 8:
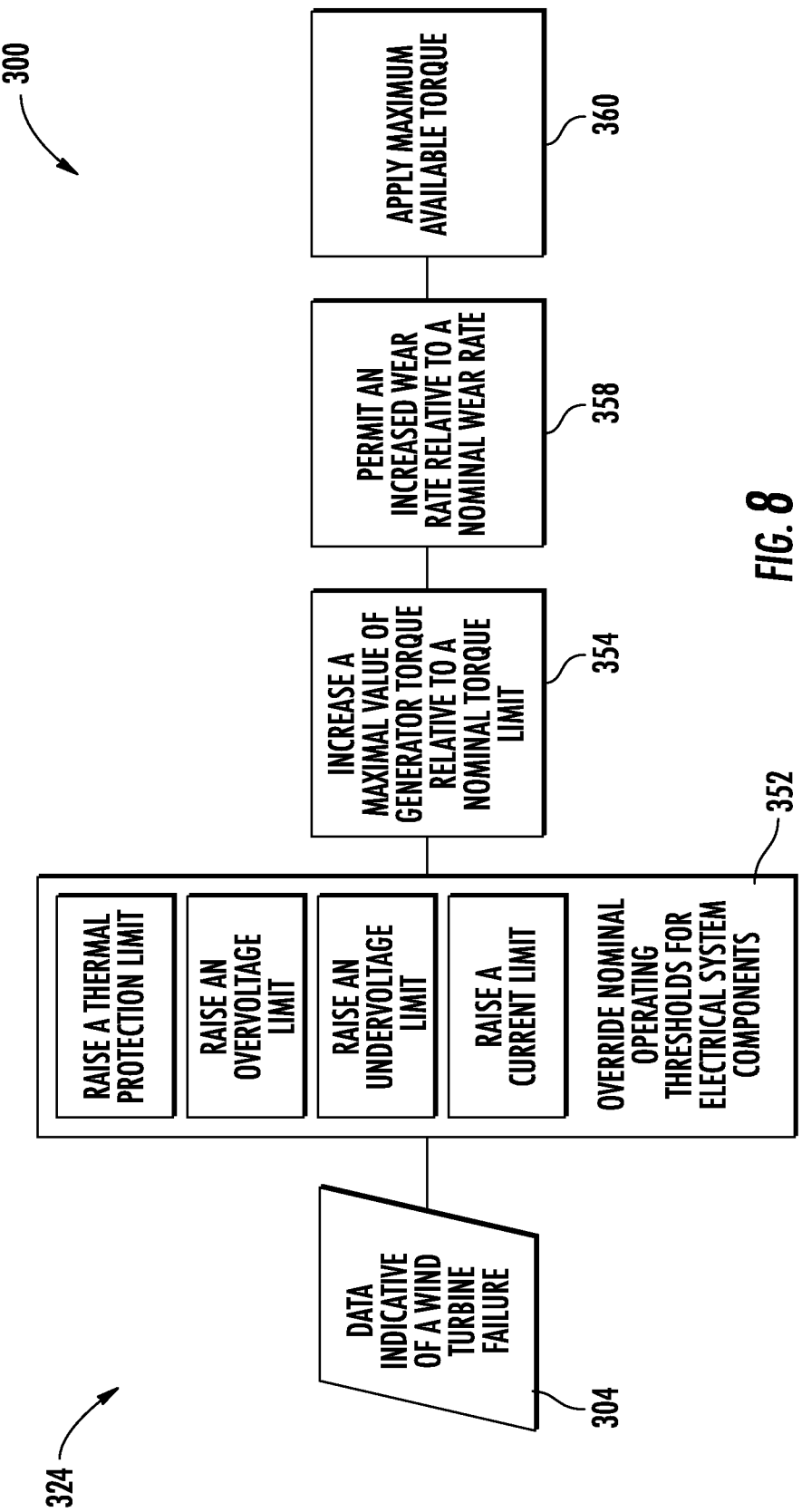
FIG. 8 illustrates a schematic diagram of one embodiment of a portion of the control logic of FIG. 6 corresponding to a second braking mode according to the present disclosure.

Referring now to FIG. 8, a schematic diagram of one embodiment of a portion of the control logic of the system 300 corresponding to the second braking mode 324 is depicted. In an embodiment, wherein the second braking mode 324 is initiated, the converter controller 202 may, at 352, override a plurality of nominal operating thresholds corresponding to a plurality of electrical system components. In an embodiment, overriding the plurality of nominal operating thresholds may, at 354 increase a maximal value of the torque 356 of the generator 118 developed by the electrical system 150 relative to the nominal torque limit 308.

In an embodiment, the system 300 may be configured to override the plurality of nominal operating thresholds at 352 by raising a thermal protection limit, an overvoltage limit, an undervoltage limit, and/or current limit of the electrical system 150 or a component of the electrical system 150.

In an embodiment, the second braking mode 324 may include permitting, at 358, an increased wear rate of the component(s) of the electrical system 150 relative to a nominal wear rate of the component(s). In such an embodiment, the increased wear rate may be permitted in favor of applying, at 360, the maximal generator torque 356. For example, the generation of maximal available torque 356 by the generator 118 may result in thermal damage to the component(s) of the electrical system 150 of the wind turbine 100. In such an embodiment, the electrical system 150 may serve as a breaker for the wind turbine 100 wherein wear or damage to the electrical system 150 is accepted in order to prevent/mitigate more significant damage to the rotor 108 or the wind turbine 100 resulting from the anomalous operational event.

In an embodiment, increasing the wear rate of the component(s) of the electrical system 150 may include permitting the consumption of the entire remaining useful life of the component(s). It should be appreciated that permitting the consumption of the remaining useful life of the component(s) may facilitate the generation of the maximal available torque 356 for a maximal duration in the second enhanced braking mode 324.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for protecting a wind turbine from anomalous operations, the method comprising: receiving, with a controller of the wind turbine, data indicative of an anomalous operational event of the wind turbine; in response to receiving the data indicative of the anomalous operational event of the wind turbine, initiating, with the controller, an enhanced braking mode for the wind turbine, the enhanced braking mode being characterized by operating the generator at a torque setpoint that generates a maximum available torque for a given set of operating conditions and which is in excess of a nominal torque limit of the generator; and operating, with the controller, the wind turbine in the enhanced braking mode.

Clause 2. The method of any preceding clause, wherein the enhanced braking mode comprises a first enhanced braking mode, the method further comprising: determining, with a converter controller of the wind turbine, an actual operating parameter for each of a plurality of electrical system components; determining, with the converter controller, an actual operating limit for each of the electrical system components based on the determined actual operating parameters, the actual operating limit indicating an operating parameter value below which the electrical system components retain a nominal life expectancy, wherein operating the electrical system components below the actual operating limit precludes the tripping of the electrical system components; determining, with the converter controller, an enhanced torque limit for the generator relative to the actual operating limit for each of the electrical system components and at least one mechanical limit of a drivetrain of the wind turbine; and establishing, with the converter controller, the torque setpoint relative to the enhanced torque limit.

Clause 3. The method of any preceding clause, wherein the actual operating parameter comprises at least one of voltage, current, and temperature levels of the electrical system components and a rotational speed of the generator.

Clause 4. The method of any preceding clause, wherein the actual operating limit for each of the electrical system components is a value corresponding to at least one of a bridge switching device temperature, a coolant temperature, a modeled converter component temperature, and a generator temperature, the method further comprising: detecting, with the converter controller, an approach of an actual operating parameter to a corresponding actual operating limit; and reducing, with the converter controller, the torque setpoint so as to prevent damaging or tripping the electrical system component during the application of the maximum available torque in the first enhanced braking mode.

Clause 5. The method of any preceding clause, further comprising: increasing, with the converter controller, the at least one actual operating limit for at least one electrical system component so as to increase a duration of the maximum available torque in the first enhanced braking mode, wherein increasing the at least one actual operating limit reduces a life expectancy of the at least one electrical system component relative to a nominal life expectancy of the at least one electrical system component.

Clause 6. The method of any preceding clause, wherein the enhanced braking mode comprises a second enhanced braking mode and wherein the anomalous operational event is indicative of failure of a blade or a tower of the wind turbine, the method further comprising: overriding, with a converter controller of the wind turbine, a plurality of nominal operating thresholds corresponding to a plurality of electrical system components, wherein overriding the plurality of nominal operating thresholds increases a maximal value of the torque of the generator developed by the electrical system relative to a nominal torque limit; and permitting an increased wear rate relative to a nominal wear rate of at least one of the plurality of electrical system components in favor of generating the maximal generator torque.

Clause 7. The method of any preceding clause, wherein overriding the plurality of nominal operating thresholds comprises raising at least one thermal protection limit, overvoltage limit, undervoltage limit, and current limit of the electrical system.

Clause 8. The method of any preceding clause, wherein permitting the increased wear rate of at least one of the plurality of electrical system components comprises permitting consumption of a remaining useful life of at least one of the plurality of electrical system components so as to generate the maximal available torque for a maximal duration in the enhanced braking mode.

Clause 9. The method of any preceding clause, wherein the wind turbine further comprises a slip coupling operably coupling the generator to a gearbox of the wind turbine, the method further comprising: monitoring, with the converter controller, a torque level of the slip coupling; and reducing, with the converter controller, the torque of the generator when the torque level of the slip coupling approaches a release threshold of the slip coupling.

Clause 10. The method of any preceding clause, wherein the anomalous operation of the wind turbine comprises an overspeed event.

Clause 11. The method of any preceding clause, wherein the anomalous operation of the wind turbine comprises a pitch system failure.

Clause 12. The method of any preceding clause, wherein the anomalous operation of the wind turbine comprises a blade departure.

Clause 13. A system for controlling a wind turbine, the system comprising: a sensor system comprising at least one sensor operably coupled to a component of the wind turbine so as to detect an anomalous operational event of the wind turbine; a controller communicatively coupled to the sensor system, the controller comprising at least one processor configured to perform a plurality of operations, the plurality of operations comprising: receiving data indicative of the anomalous operational event of the wind turbine, in response to receiving the data indicative of the anomalous operation of the wind turbine, initiating an enhanced braking mode for the wind turbine, the enhanced braking mode being characterized by operating the generator at a torque setpoint that generates a maximum available torque for a given set of operating conditions and which is in excess of a nominal torque limit of the generator, and operating the wind turbine in the enhanced braking mode.

Clause 14. The system of any preceding clause, wherein the enhanced braking mode is a first enhanced braking mode and wherein the controller comprises a converter controller, the plurality of operations further comprising: determining an actual operating parameter for each of a plurality of electrical system components; determining an actual operating limit for each of the electrical system a components based on the actual operating parameters, the actual operating limit indicating an operating parameter value below which the electrical system components retain a nominal life expectancy, wherein operating the electrical system components below the actual operating limit precludes the tripping of the electrical system components; determining an enhanced torque limit for the generator relative to the actual operating limit for each of the electrical system components and at least one mechanical limit of a drivetrain of the wind turbine; and establishing the torque setpoint relative to the enhanced torque limit.

Clause 15. The system of any preceding clause, wherein the actual operating parameters comprise at least one of voltage, current, and temperature levels of the electrical system components and a rotational speed of the generator.

Clause 16. The system of any preceding clause, wherein the actual operating limit for each of the electrical system components is a value corresponding to at least one of a bridge switching device temperature, a coolant temperature, a modeled converter component temperature, and a generator temperature, the plurality of operations further comprising: detecting an approach of an actual operating parameter to a corresponding actual operating limit; and reducing the torque setpoint so as to prevent damaging or tripping the electrical system component during the application of the maximum available torque in the first enhanced braking mode.

Clause 17. The system of any preceding clause, wherein the plurality of operations further comprises: increasing the at least one actual operating limit for at least one electrical system component so as to increase a duration of the maximum available torque in the first enhanced braking mode, wherein increasing the at least one actual operating limit reduces a life expectancy of the at least one electrical system component relative to the nominal life expectancy of the at least one electrical system component.

Clause 18. The system of any preceding clause, wherein the enhanced braking mode is a second enhanced braking mode, wherein the controller comprises a converter controller of the wind turbine, and wherein the anomalous operational event is indicative of failure of a blade or a tower of the wind turbine, the plurality of operations further comprises: overriding a plurality of nominal operating thresholds corresponding to a plurality of electrical system components, wherein overriding the plurality of nominal operating thresholds increases a maximal value of the torque of the generator developed by the electrical system relative to a nominal torque limit; and permitting an increased wear rate relative to a nominal wear rate of at least one of the plurality of electrical system components in favor of generating the maximal generator torque.

Clause 19. The system of any preceding clause, wherein overriding the plurality of nominal operating thresholds comprises raising at least one thermal protection limit, overvoltage limit, undervoltage limit, and current limit of the electrical system.

Clause 20. The system of any preceding clause, wherein the wind turbine further comprises a slip coupling operably coupling the generator to a gearbox of the wind turbine and wherein the controller comprises a converter controller, the plurality of operations further comprising: monitoring a torque level of the slip coupling; and reducing the torque of the generator when the torque level of the slip coupling approaches a release threshold of the slip coupling.

What is claimed is:

1. A method for protecting a wind turbine from anomalous operations, the method comprising:
   receiving, with a controller of the wind turbine, data indicative of an anomalous operational event of the wind turbine;
   in response to receiving the data indicative of the anomalous operational event of the wind turbine, initiating, with the controller, an enhanced braking mode for the wind turbine, the enhanced braking mode comprising, at least, a first enhanced braking mode, the first enhanced braking mode being characterized by operating a generator of the wind turbine at a torque setpoint that generates a maximum available torque for a given set of operating conditions and which is in excess of a nominal torque limit of the generator; and
   operating, with the controller, the wind turbine in the first enhanced braking mode, the first enhanced braking mode comprising:
      determining, with a converter controller of the wind turbine, an actual operating parameter for each of a plurality of electrical system components;
      determining, with the converter controller, an actual operating limit for each of the electrical system components based on the determined actual operating parameters, the actual operating limit indicating an operating parameter value below which the electrical system components retain a nominal life expectancy, wherein operating the electrical system components below the actual operating limit precludes the tripping of the electrical system components;
      determining, with the converter controller, an enhanced torque limit for the generator relative to the actual operating limit for each of the electrical system components and at least one mechanical limit of a drivetrain of the wind turbine; and,
      establishing, with the converter controller, the torque setpoint relative to the enhanced torque limit.

2. The method of claim 1, wherein the actual operating parameter comprises at least one of voltage, current, and temperature levels of the electrical system components and a rotational speed of the generator.

3. The method of claim 2, wherein the actual operating limit for each of the electrical system components is a value corresponding to at least one of a bridge switching device temperature, a coolant temperature, a modeled converter component temperature, and a generator temperature, the method further comprising:
   detecting, with the converter controller, an approach of an actual operating parameter to a corresponding actual operating limit; and
   reducing, with the converter controller, the torque setpoint so as to prevent damaging or tripping the electrical system component during the application of the maximum available torque in the first enhanced braking mode.

4. The method of claim 1, further comprising:
   increasing, with the converter controller, the at least one actual operating limit for at least one electrical system component so as to increase a duration of the maximum available torque in the first enhanced braking mode, wherein increasing the at least one actual operating limit reduces a life expectancy of the at least one electrical system component relative to a nominal life expectancy of the at least one electrical system component.

5. The method of claim 1, wherein the enhanced braking mode comprises a second enhanced braking mode and wherein the anomalous operational event is indicative of failure of a blade or a tower of the wind turbine, the second enhanced braking mode comprising:
   overriding, with a converter controller of the wind turbine, a plurality of nominal operating thresholds corresponding to a plurality of electrical system components, wherein overriding the plurality of nominal operating thresholds increases a maximal value of the torque of the generator developed by the electrical system relative to a nominal torque limit; and
   permitting an increased wear rate relative to a nominal wear rate of at least one of the plurality of electrical system components in favor of generating the maximal generator torque.

6. The method of claim 5, wherein overriding the plurality of nominal operating thresholds comprises raising at least one thermal protection limit, overvoltage limit, undervoltage limit, and current limit of the electrical system.

7. The method of claim 5, wherein permitting the increased wear rate of at least one of the plurality of electrical system components comprises permitting consumption of a remaining useful life of at least one of the plurality of electrical system components so as to generate the maximal available torque for a maximal duration in the enhanced braking mode.

8. The method of claim 1, wherein the wind turbine further comprises a slip coupling operably coupling the generator to a gearbox of the wind turbine, the method further comprising:

monitoring, with the converter controller, a torque level of the slip coupling; and reducing, with the converter controller, the torque of the generator when the torque level of the slip coupling approaches a release threshold of the slip coupling.

9. The method of claim 1, wherein the anomalous operation of the wind turbine comprises an overspeed event.

10. The method of claim 1, wherein the anomalous operation of the wind turbine comprises a pitch system failure.

11. The method of claim 1, wherein the anomalous operation of the wind turbine comprises a blade departure.

12. A system for controlling a wind turbine, the system comprising:

a sensor system comprising at least one sensor operably coupled to a component of the wind turbine so as to detect an anomalous operational event of the wind turbine;

a controller communicatively coupled to the sensor system, the controller comprising at least one processor configured to perform a plurality of operations, the plurality of operations comprising:

receiving data indicative of the anomalous operational event of the wind turbine, in response to receiving the data indicative of the anomalous operation of the wind turbine, initiating an enhanced braking mode for the wind turbine, the enhanced braking mode comprising, at least, a first enhanced braking mode, the first enhanced braking mode being characterized by operating a generator of the wind turbine at a torque setpoint that generates a maximum available torque for a given set of operating conditions and which is in excess of a nominal torque limit of the generator and operating the wind turbine in the first enhanced braking mode, the first enhanced braking mode comprising:

determining, with a converter controller of the wind turbine, an actual operating parameter for each of a plurality of electrical system components;

determining, with the converter controller, an actual operating limit for each of the electrical system components based on the determined actual operating parameters, the actual operating limit indicating an operating parameter value below which the electrical system components retain a nominal life expectancy, wherein operating the electrical system components below the actual operating limit precludes the tripping of the electrical system components;

determining, with the converter controller, an enhanced torque limit for the generator relative to the actual operating limit for each of the electrical system components and at least one mechanical limit of a drivetrain of the wind turbine; and, establishing, with the converter controller, the torque setpoint relative to the enhanced torque limit.

13. The system of claim 12, wherein the actual operating parameters comprise at least one of voltage, current, and temperature levels of the electrical system components and a rotational speed of the generator.

14. The system of claim 13, wherein the actual operating limit for each of the electrical system components is a value corresponding to at least one of a bridge switching device temperature, a coolant temperature, a modeled converter component temperature, and a generator temperature, the plurality of operations further comprising:

detecting an approach of an actual operating parameter to a corresponding actual operating limit; and reducing the torque setpoint so as to prevent damaging or tripping the electrical system component during the application of the maximum available torque in the first enhanced braking mode.

15. The system of claim 12, wherein the plurality of operations further comprises:

increasing the at least one actual operating limit for at least one electrical system component so as to increase a duration of the maximum available torque in the first enhanced braking mode, wherein increasing the at least one actual operating limit reduces a life expectancy of the at least one electrical system component relative to the nominal life expectancy of the at least one electrical system component.

16. The system of claim 12, wherein the enhanced braking mode comprises is-a second enhanced braking mode, wherein the controller comprises a converter controller of the wind turbine, and wherein the anomalous operational event is indicative of failure of a blade or a tower of the wind turbine, wherein the second enhanced braking mode comprises:

overriding a plurality of nominal operating thresholds corresponding to a plurality of electrical system components, wherein overriding the plurality of nominal operating thresholds increases a maximal value of the torque of the generator developed by the electrical system relative to a nominal torque limit; and permitting an increased wear rate relative to a nominal wear rate of at least one of the plurality of electrical system components in favor of generating the maximal generator torque.

17. The system of claim 16, wherein overriding the plurality of nominal operating thresholds comprises raising at least one thermal protection limit, overvoltage limit, undervoltage limit, and current limit of the electrical system.

18. The system of claim 12, wherein the wind turbine further comprises a slip coupling operably coupling the generator to a gearbox of the wind turbine and wherein the controller comprises a converter controller, the plurality of operations further comprising:

monitoring a torque level of the slip coupling; and reducing the torque of the generator when the torque level of the slip coupling approaches a release threshold of the slip coupling.

* * * * *